(12) United States Patent
Cruz-Hernandez et al.

(10) Patent No.: US 10,649,532 B2
(45) Date of Patent: May 12, 2020

(54) SYSTEMS AND METHODS FOR MULTI-RATE CONTROL OF HAPTIC EFFECTS WITH SENSOR FUSION

(71) Applicant: Immersion Corporation, San Jose, CA (US)

(72) Inventors: Juan Manuel Cruz-Hernandez, Montreal (CA); Danny A. Grant, Laval (CA); Christopher J. Ullrich, Ventura, CA (US)

(73) Assignee: Immersion Corporation, San Jose, CA (US)

( * ) Notice: Subject to any disclaimer, the term of this patent is extended or adjusted under 35 U.S.C. 154(b) by 19 days.

(21) Appl. No.: 16/010,209

(22) Filed: Jun. 15, 2018

(65) Prior Publication Data

US 2019/0384397 A1 Dec. 19, 2019

(51) Int. Cl.
*A61F 9/08* (2006.01)
*G06F 3/041* (2006.01)
*G06F 3/01* (2006.01)

(52) U.S. Cl.
CPC .............. *G06F 3/016* (2013.01); *G06F 3/041* (2013.01)

(58) Field of Classification Search
CPC ...................................................... G06F 3/016
See application file for complete search history.

(56) References Cited

U.S. PATENT DOCUMENTS

| 2003/0076297 | A1 | 4/2003 | Hasser | |
| 2011/0075835 | A1 | 3/2011 | Hill | |
| 2012/0229264 | A1 | 9/2012 | Company Bosch et al. | |
| 2012/0232780 | A1 | 9/2012 | Delson et al. | |
| 2014/0267076 | A1* | 9/2014 | Birnbaum | B25J 13/025 345/173 |
| 2015/0268726 | A1* | 9/2015 | Saboune | G06F 3/016 345/156 |
| 2016/0162025 | A1* | 6/2016 | Shah | G06F 3/016 345/156 |
| 2017/0169674 | A1 | 6/2017 | Macours | |
| 2017/0178470 | A1* | 6/2017 | Khoshkava | G06F 3/016 |
| 2017/0365139 | A1* | 12/2017 | Levesque | G06F 3/016 |

OTHER PUBLICATIONS

EP 19180359.2, "Extended European Search Report," dated Nov. 4, 2019, 8 pages.

* cited by examiner

*Primary Examiner* — Joseph H Feild
*Assistant Examiner* — Pameshanand Mahase
(74) *Attorney, Agent, or Firm* — Kilpatrick Townsend & Stockton LLP

(57) ABSTRACT

Systems and methods for multi-rate control of haptic effects with sensor fusion are disclosed. One illustrative system includes, a haptic output device configured to output a haptic effect, a first sensor configured to sense the output of the haptic output device and generate a first sensor signal, a processor in communication with the first sensor. The processor is configured to: sample the first sensor signal from the first sensor at a first rate, receive a reference signal, determine an error between the first sensor signal and the reference signal, generate a haptic signal based at least in part on the reference signal and the error, transmit the haptic signal to a haptic output device configured to output a haptic effect based on the haptic signal, and sample the first sensor signal at a second rate, wherein the second rate is lower than the first rate.

20 Claims, 3 Drawing Sheets

SYSTEMS AND METHODS FOR MULTI-RATE CONTROL OF HAPTIC EFFECTS WITH SENSOR FUSION

FIELD OF THE INVENTION

The present application relates to the field of haptic effects. More specifically, the present application relates to multi-rate control of haptic effects with sensor fusion.

BACKGROUND

Haptic effects improve usability in devices generally, and particularly in mobile devices. This has led to an increase in the breadth of implementation of haptics. As haptics is implemented in varied devices, it can be a challenge to ensure high-quality, consistent haptic effects across a range of different devices, while efficiently utilizing the device on which the haptics are provided. Systems and methods for multi-rate control of haptic effects with sensor fusion are needed to help ensure the quality and consistency of such haptic effects.

SUMMARY

In one embodiment, a system for multi-rate control of haptic effects with sensor fusion comprises a haptic output device configured to output a haptic effect, a first sensor configured to sense the output of the haptic output device and generate a first sensor signal, a processor in communication with the first sensor. The processor is configured to: sample the first sensor signal from the first sensor at a first rate, receive a reference signal, determine an error between the first sensor signal and the reference signal, generate a haptic signal based at least in part on the reference signal and the error, transmit the haptic signal to a haptic output device configured to output a haptic effect based on the haptic signal, and sample the first sensor signal at a second rate, wherein the second rate is lower than the first rate.

In another embodiment, a system comprises a haptic output device configured to output a haptic effect, a first sensor configured to sense the output of the haptic output device and generate a first sensor signal, a second sensor configured to sense the output of the haptic output device and generate a sensor signal, a processor in communication with the first sensor and the second sensor. The processor is configured to: receive the first sensor signal from the first sensor, receive the second sensor signal from the second sensor, generate a haptic signal based at least in part on the first sensor signal and the second sensor signal, and transmit the haptic signal to a haptic output device configured to output a haptic effect based on the haptic signal.

Another embodiment comprises a method for multi-rate control of haptic effects with sensor fusion comprises sampling a first sensor signal from a first sensor at a first rate, the first sensor configured to sense the output of a haptic output device, receiving a reference signal, determining an error between the first sensor signal and the reference signal, generating a haptic signal based at least in part on the reference signal and the error, transmitting the haptic signal to a haptic output device configured to output a haptic effect based on the haptic signal, and sampling the first sensor signal at a second rate, wherein the second rate is lower than the first rate. In another embodiment, a non-transitory computer readable medium may comprise program code, which when executed by a processor is configured to enable the above described method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
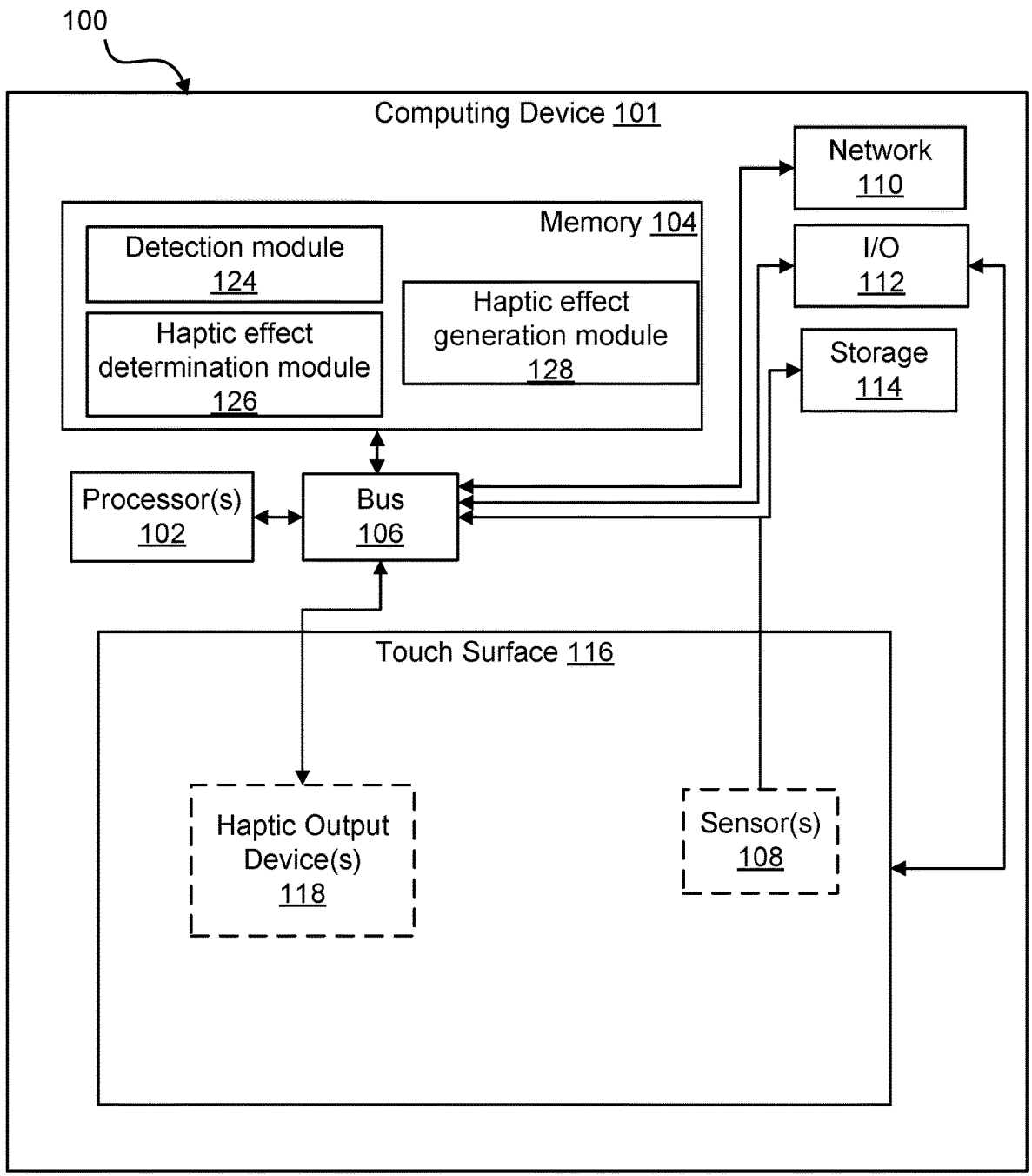
FIG. 1 shows an illustrative system for multi-rate control of haptic effects with sensor fusion in one embodiment.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example System for Multi-Rate Control of Haptic Effects with Sensor Fusion In one illustrative embodiment, a mobile application executing on a mobile device, such as a smart phone, enables a user to perform a variety of tasks. The mobile application includes an interface that provides the user with user interface elements, such as virtual buttons. When the user touches the touch screen of the smart phone at the location of the button, the application executes the function associated with the button.

The user's interaction with the user interface is improved by providing haptic effects in response to the user's actions. For example, when the user presses the virtual button, the mobile device in the illustrative embodiment outputs a crisp click to inform the user that the button press was successful. The mobile phone may utilize a linear resonance actuator (LRA) to provide the haptic feedback. Or the mobile device might use a different type of haptic output device.

The mobile device in the illustrative embodiment includes a plurality of sensors to sense the output of the haptic output device. The sensor signals produced by these sensors can be used to ensure that the haptic effect is consistent across devices and across multiple actuators. And by using a plurality of sensors, some embodiments can provide a broader picture of how the haptic effect is output. A closed loop control, such as in the illustrative embodiment, can add programmable damping to help control the haptic effect. Such control typically requires a relatively high sampling and control loop rate (e.g., greater than about 15 KHz) to reliably generate of programmable damping. The benefit of adding damping to control actuators is the removal of unwanted oscillations when the command (reference) signal is zero after driving the actuator with a signal. It may be advantageous to not possible maintain such high frequency sampling rates at all times as the microcontroller might become saturated with requests from the closed loop controller. Thus, it may be desirable to have a controller that is capable of adapting to use a low frequency sampling rate in some cases (no effect output) and high frequency sampling rate in other situations (haptic effect output).

The illustrative embodiment fuses the various sensor signals together. In the case of a plurality of homogenous sensors, e.g., the same type of sensors, the processor in the smart phone can average the signals. In other embodiments, the processor may have to normalize the signal, i.e., modify at least some of the signals in some way so that they can be combined.

The processor in the mobile device samples the sensor signals. In order to provide a high-quality, consistent effect, the processor samples the signals at a relatively high sampling rate, e.g., approximately 50 microseconds, while the effect is output. Then, the processor switches to a second, slower sampling rate, e.g., approximately 1 millisecond, after the effect is complete. In this way, the processor is used more efficiently than if it were consistently sampling at the higher rate.

The preceding example is merely illustrative and not meant to limit the claimed invention in any way.

Illustrative Systems for Multi-Rate Control of Haptic Effects with Sensor Fusion FIG. 1 shows an illustrative system 100 for multi-rate control of haptic effects with sensor fusion. Particularly, in this example, system 100 comprises a computing device 101 having a processor 102 interfaced with other hardware via bus 106. Device 101 may be any type of device, including for example, a mobile phone or pad. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network(s)).

I/O components 112 may be used to facilitate connection to devices such as one or more displays, touch screen displays, keyboards, mice, speakers, microphones, cameras, and/or other hardware used to input data or output data. In an embodiment for use in a virtual or augmented reality environment, I/O components 112 may include handheld VR controllers. Storage 114 represents nonvolatile storage such as magnetic, optical, or other storage media included in device 101.

System 100 further includes a touch surface 116, which, in this example, is integrated into device 101. Touch surface 116 represents any surface that is configured to sense touch input of a user. Touch surface 116 may include a display for displaying interface elements with which a user can interact, such as, for example, one or more buttons.

One or more sensors 108 are configured to detect a touch in a touch area when an object contacts a touch surface and provide appropriate data for use by processor 102. Sensor 108 may also be used to detect the output of the haptic output device 118. Any suitable number, type, or arrangement of sensors can be used. For example, resistive and/or capacitive sensors may be embedded in touch surface 116 and used to determine the location of a touch and other information, such as pressure. As another example, optical sensors with a view of the touch surface may be used to determine the touch position. The sensor 108 for determining the haptic effect that is output may also comprise an accelerometer, Hall Effect sensor, or optical sensor.

In some embodiments, sensor 108, touch surface 116, and I/O components 112 may be integrated into a single component such as a touch screen display. For example, in some embodiments, touch surface 116 and sensor 108 may comprise a touch screen mounted overtop of a display configured to receive a display signal and output an image to the user. Such embodiments might include smart phones or touch pads, such as those used as stand-alone pads or in applications such as vehicles.

In other embodiments, the sensor 108 may comprise an LED detector. For example, in one embodiment, touch surface 116 may comprise an LED finger detector mounted on the side of a display. In some embodiments, the processor 102 is in communication with a single sensor 108, in other embodiments, the processor 102 is in communication with a plurality of sensors 108, for example, a first touch screen and a second touch screen. The sensor 108 is configured to detect user interaction, haptic effects or other actions and, based on the action, transmit sensor signals to processor 102. In some embodiments, sensor 108 may be configured to detect multiple aspects of a user interaction. For example, sensor 108 may detect the speed and pressure of a user interaction and incorporate this information into the interface signal. Similarly, sensor 108 (or multiple sensors 108) may detect multiple properties of an output haptic effect, such as magnitude, direction, frequency, or other properties.

Device 101 further comprises a haptic output device 118. In the example shown in FIG. 1 haptic output device 118 is in communication with processor 102 and is coupled to touch surface 116. The embodiment shown in FIG. 1 comprises a single haptic output device 118. In other embodiments, computing device 101 may comprise a plurality of haptic output devices.

Although a single haptic output device 118 is shown here, embodiments may use multiple haptic output devices of the same or different type to output haptic effects. For example, haptic output device 118 may comprise one or more of, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA), a low profile haptic actuator, a haptic tape, or a haptic output device configured to output an electrostatic effect, such as an Electrostatic Friction (ESF) actuator. In some embodiments, haptic output device 118 may comprise a plurality of actuators, for example a low profile haptic actuator, a piezoelectric actuator, and an LRA.

Turning to memory 104, exemplary program components 124, 126, and 128 are depicted to illustrate how a device may be configured to determine and output haptic effects. In this example, a detection module 124 configures processor 102 to monitor touch surface 116 via sensor 108 to determine a position of a touch. For example, module 124 may sample sensor 108 in order to track the presence or absence of a touch and, if a touch is present, to track one or more of the location, path, velocity, acceleration, pressure, and/or other characteristics of the touch over time. Alternatively or in addition, detection module 124 may be configured to detect the output from haptic output device 118.

Haptic effect determination module 126 represents a program component that analyzes data regarding the output haptic effect and the reference signal determine a drive signal to send to the haptic output device 118.

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of haptic effect and utilize signal processing algorithms to generate an appropriate signal to send to haptic output device 118. As a further example, a desired haptic effect may be indicated along with target coordinates for the texture and an appropriate waveform sent to one or more actuators to generate appropriate displacement of the surface (and/or other device components) to provide the haptic effect. Some embodiments may utilize multiple haptic output devices in concert to simulate a feature. For instance, a variation in texture may be used to simulate crossing a boundary between buttons on an interface while a vibrotactile effect simulates the response when the button is pressed.

Figure 2:
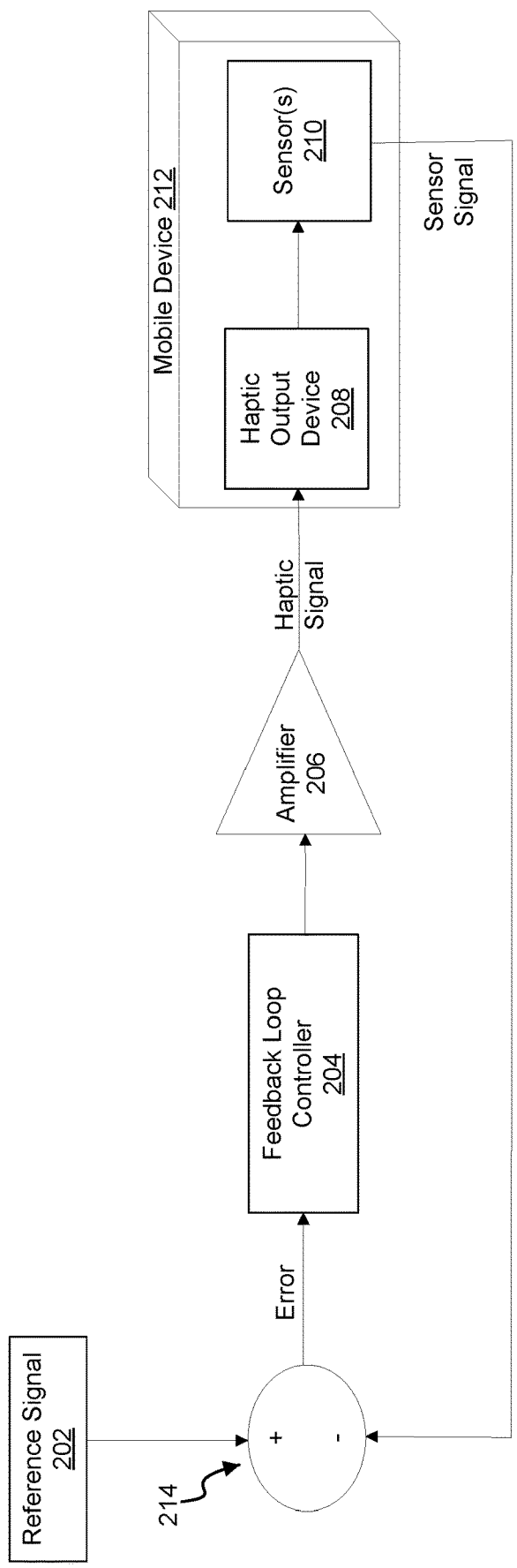
FIG. 2 shows another illustrative system for multi-rate control of haptic effects with sensor fusion in one embodiment.

FIG. 2 shows another illustrative system for multi-rate control of haptic effects with sensor fusion in one embodiment. In the embodiment shown in FIG. 2, a reference signal 202 is provided to the system. The reference signal 202 represents the haptic effect that a designer wishes to be output by a device. For example, a designer may wish for a virtual button to feel very crisp and mechanical. In another embodiment, a haptic effect designer may wish for a haptic effect to feel vibrato or crunchy. The reference signal 202 reflects the designer's wishes or design choices.

The reference signal is provided to a comparator, which is described below and then to a feedback loop controller 204. The feedback loop controller provides the signal to an amplifier 206. The reference signal 202 is meant to reflect the desired haptic output. The reference signal 202 includes a variety of properties, including, for example frequency, magnitude, duration, and wave shape. These properties may cause the feedback loop controller 204 to utilize a particular algorithm and may cause the amplifier 206 utilize a particular gain. In other embodiments, the type of feedback control and the level of gain may be fixed. As one example, the desired shape versus the actual shape could be used to select the appropriate gain for the amplifier 206. For example, an embodiment might be designed to shorten the tail or an effect. Another embodiment might be designed to manage the rise of the effect, or both the rise and tail of an effect. In another embodiment, the frequency of the reference signal 202 could be used to select the gain.

The amplifier 206 generates a haptic or driving signal and transmits the haptic signal to the haptic output device 208. The haptic output device 208 can be any sort of actuator, including for example, an LRA, vibrating actuator, or cantilevered piezo-electric actuator.

The output of the haptic output device 208 is then sensed by a sensor 210. The sensor 210 may comprise various types of sensors and may comprise a plurality of sensors. For example, sensor 210 may comprise a Hall Effect sensor, a position sensor for sensing movement within the haptic output device 208, an accelerometer, a gyroscope, an optical sensor, such as a camera or infrared sensor, or any other type of sensor or combinations of sensors for detecting the output of the haptic output device and generating sensor signal corresponding to the output haptic effect. While the haptic output device 208 and sensor 210 are shown as separate components, they may be combined in some embodiments. In the embodiment shown, the haptic output device 208 and sensor 210 are contained within a mobile device 212. The mobile device 212 may comprise, for example, a smart phone, tablet, or a device installed in, for instance, a vehicle.

The sensor signal is provided to a comparator 214 for determining an error between the reference signal 202 and the sensor signal output by the sensor 210. In the embodiment shown, the reference signal 202 and the sensor signal must be of the same type of signal. In other words, the reference signal reflects what the design of the desired haptic feedback effect as it is output from the haptic output device. However, in other embodiments, different types of signals might be used to determine an error. The error is then provided to the feedback loop controller 204. The feedback loop controller 204 uses the error to modulate the drive signal.

The feedback loop controller 204 may be of various types. For example, the feedback loop controller 204 might be a proportional-derivative (PD), proportional-integral-derivative (PID), or lead-lag controller. The type of controller might be based on the particular application. For example, a lead-lag controller provides substantial damping and so may be used when a crisp effect is desired. The feedback loop controller 204 may be selected based on the type of reference signal 202. In this way, the system shown in FIG. 2 can control the shape (e.g., a sharp effect versus one with a tail), magnitude and duration of a haptic effect while using the same reference signal across a variety of devices.

In some embodiments, the components shown in FIG. 2 may be implemented on a chip. In other embodiments, the components might be implemented as software executing on a mobile device. In further embodiments, the components may be implemented as a combination of one or more chips and software executing on the device. Other configurations may also be implemented. For example, in some embodiments, the components may be implemented in an ASIC using a general core with an instruction set. The ASIC might be controlled with parameters. For example, an ASIC might include multiple controllers or a single controller with multiple parameters to control its operation.

Figure 3:
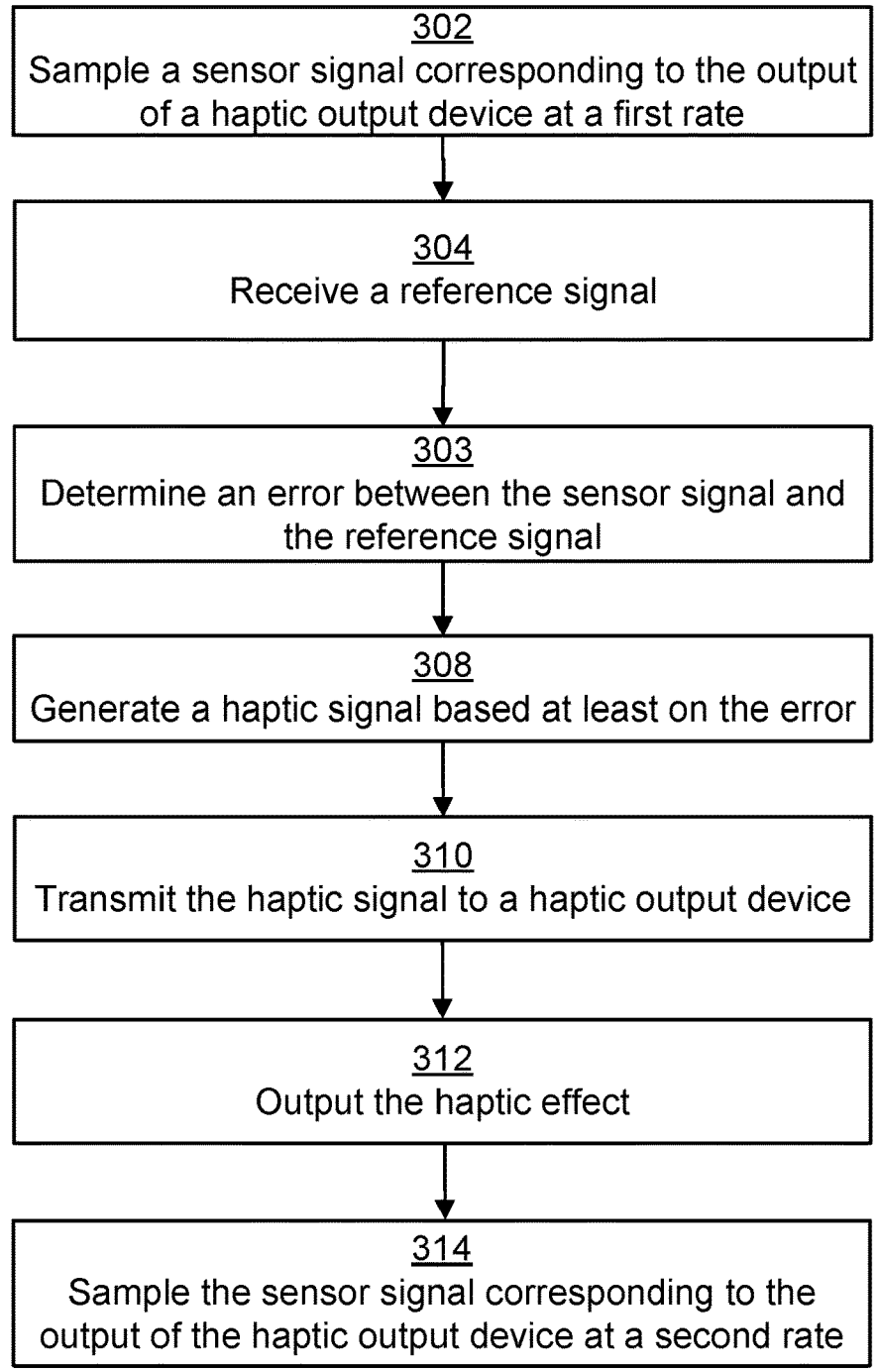
FIG. 3 is a flowchart illustrating a method 300 according to one embodiment. In the embodiment shown, the system.

Illustrative Example Method for Multi-Rate Control of Haptic Effects with Sensor Fusion FIG. 3 is a flowchart illustrating a method 300 according to one embodiment. The process shown begins when a processor samples a sensor signal corresponding to the output of a haptic output device at a first rate 302. In one embodiment, the first rate is a relatively high rate that allows the processor to provide granular control of a haptic output device to ensure a high-quality haptic effect from the haptic output device.

The processor also receives a reference signal 304. The reference signal in the embodiment shown is meant to represent a sensor signal that would be generated if a haptic output device accurately created a haptic effect.

The processor then determines an error between the reference signal and the sensor signal 303. For example, the sensor signal and the reference signal may be designed so that the sensor signal should approximate the reference signal. Thus any error, or difference, between the signals indicates that the haptic effect that is output is not accurately reflecting the reference signal.

In some embodiments, the sensor may comprise a plurality of sensors. The signals from the plurality of sensors may be fused to provide a more accurate view of how the haptic output device outputs the haptic effect. The sensors may be homogenous or heterogeneous. Homogenous sensors are substantially similar. For example, an embodiment may utilize a plurality of similar accelerometers or optical sensors. However, such an embodiment need not utilize a plurality of identical sensors. In the case of homogenous sensors, the sensor signal may be averaged since the properties of the multiple signals should be similar. If the sensors are heterogeneous, some or all of the plurality of signals may need to be modified so that they can be compared to the reference signal.

The processor next generates a haptic effect signal to drive the haptic output device, the haptic effect signal based at least in part on the error 308. For example, the processor may use the determined error to modify the reference signal before outputting a modified drive signal. The processor next transmits the haptic signal to a haptic output device. The haptic output device then outputs the haptic effect 312.

The processor then samples the sensor signal corresponding to the output of the haptic output device at a second rate 314. The second rate may be at a rate that is lower than the first rate. For instance, in one embodiment, the first rate may be approximately 50 microseconds and the second rate may be approximately 1 millisecond. The processor may continue to sample at the second rate until another haptic effect is to be output, and then when the effect is output, the processor can switch back to the first, higher rate again in order to ensure a high-quality effect is output. In some embodiments, a processor might utilize multiple threads to accomplish the method shown in FIG. 3. The process 300 shown in FIG. 3 may be performed by the systems illustrated in FIGS. 1 and 2 or other systems for performing closed-loop generation of haptic effects.

Embodiments described herein provide numerous advantages over conventional systems for generating haptic effects. For examples, embodiments provide more efficient use of limited processing cycles on the device. For example, the processor of a mobile device manages input, display, and communications along with many other tasks. Closed-loop haptics may require significant processing cycles while the effect is being output and so by only increasing the sampling rate while the effect is output, some embodiments can minimize the amount of cycles necessary to control the effect.

Embodiments that utilize sensor fusion may provide a more accurate haptic effect since the behavior of the haptic effect is analyzed by multiple sensors in multiple ways. In this manner, some embodiments may provide a more consistent effect across actuators or other haptic output devices, and even among various mobile devices, such as different types and models of smart phones.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method comprising:
   sampling a first sensor signal from a first sensor at a first rate, the first sensor configured to sense the output of a haptic output device;
   sampling a second sensor signal from a second sensor the second sensor configured to sense the output of the haptic output device;
   fusing the first sensor signal and the second sensor signal to create a fused sensor signal;
   receiving a reference signal;
   determining an error between the fused sensor signal and the reference signal;
   generating a haptic signal based at least in part on the reference signal and the error;
   transmitting the haptic signal to a haptic output device configured to output a haptic effect based on the haptic signal; and
   sampling the first sensor signal at a second rate, wherein the second rate is lower than the first rate.

2. The method of claim 1, wherein the first rate comprises approximately 50 microseconds and the second rate comprises approximately 1 millisecond.

3. The method of claim 1, wherein the first sensor and the second sensor are homogenous.

4. The method of claim 1, wherein the first sensor and the second sensor are heterogeneous.

5. The method of claim 4, further comprising modifying the second sensor signal based on a property of the first sensor signal or the reference signal.

6. The method of claim 1, wherein the reference signal represents a desired haptic effect.

7. The method of claim 1, wherein the first sensor comprises an optical sensor.

8. The method of claim 7, wherein the second sensor comprises one or more of a Hall Effect sensor, an accelerometer, a gyroscope, or an optical sensor.

9. A method comprising:
   receiving a first sensor signal from a first sensor, the first sensor configured to sense the output of a haptic output device;
   receiving a second sensor signal from a second sensor, the second sensor configured to sense the output of the haptic output device;
   fusing the first sensor signal and the second sensor signal to create a fused sensor signal;
   receiving a reference signal;
   determining an error between the reference signal and the fused sensor signal;
   generating a haptic signal based at least in part on first sensor signal, the second sensor signal, and the error; and
   transmitting the haptic signal to a haptic output device configured to output a haptic effect based on the haptic signal.

10. The method of claim 9, wherein the first sensor and the second sensor are homogenous.

11. The method of claim 9, wherein the first sensor and the second sensor are heterogeneous.

12. A system comprising:
    a haptic output device configured to output a haptic effect;
    a first sensor configured to sense the output of the haptic output device and generate a first sensor signal;
    a processor in communication with the first sensor, the processor configured to:
      sample the first sensor signal from the first sensor at a first rate;
      sample a second sensor signal from a second sensor the second sensor configured to sense the output of the haptic output device;
      fuse the first sensor signal and the second sensor signal to create a fused sensor signal;
      receive a reference signal;
      determine an error between the fused sensor signal and the reference signal;
      generate a haptic signal based at least in part on the reference signal and the error;
      transmit the haptic signal to a haptic output device configured to output a haptic effect based on the haptic signal; and
      sample the first sensor signal at a second rate, wherein the second rate is lower than the first rate.

13. The system of claim 12, wherein the first rate comprises approximately 50 microseconds and the second rate comprises approximately 1 millisecond.

14. The system of claim 12, wherein the first sensor and the second sensor are homogenous.

15. The system of claim 12, wherein the first sensor and the second sensor are heterogeneous.

16. The system of claim 12, wherein the processor is further configured to modify the second sensor signal based on a property of the first sensor signal or the reference signal.

17. A system comprising:
a haptic output device configured to output a haptic effect;
a first sensor configured to sense the output of the haptic output device and generate a first sensor signal;
a second sensor configured to sense the output of the haptic output device and generate a second sensor signal;
a processor in communication with the first sensor, the processor configured to: receive the first sensor signal from the first sensor; receive the second sensor signal from the second sensor; fuse the first sensor signal and the second sensor signal to create a fused sensor signal:
receive a reference signal:
determine an error between the reference signal and the fused sensor signal:
generate a haptic signal based at least in part on the first sensor signal, and the second sensor signal, and the error: and
transmit the haptic signal to a haptic output device configured to output a haptic effect based on the haptic signal.

18. The system of claim 16, wherein the first sensor and the second sensor are homogenous.

19. The system of claim 17, wherein the first sensor and the second sensor are heterogeneous.

20. A non-transitory computer readable medium comprising program code, which when executed by a processor is configured to cause the processor to:
sample a first sensor signal from the first sensor at a first rate;
sample a second sensor signal from a second sensor the second sensor configured to sense the output of a haptic output device;
fuse the first sensor signal and the second sensor signal to create a fused sensor signal;
receive a reference signal;
determine an error between the fused sensor signal and the reference signal;
generate a haptic signal based at least in part on the reference signal and the error;
transmit the haptic signal to the haptic output device configured to output a haptic effect based on the haptic signal.

\* \* \* \* \*